United States Patent
Dulisse et al.

(10) Patent No.: US 6,793,095 B1
(45) Date of Patent: *Sep. 21, 2004

(54) BLOW-MOLDED PRESSURE TANK WITH SPIN-WELDED CONNECTOR

(75) Inventors: Michael Dulisse, Elgin, IL (US); Charles D. Poellet, Fort Worth, TX (US); Rick Fogle, Hanover Park, IL (US)

(73) Assignee: Essef Corporation, Chardon, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/018,755

(22) Filed: Feb. 4, 1998

(51) Int. Cl.$^7$ .................................................. B65D 6/40
(52) U.S. Cl. ..................... 220/612; 156/74; 220/613; 220/DIG. 29; 220/DIG. 31
(58) Field of Search ................................ 220/612, 613, 220/582, 586, 581, 588, 589, 590, 592, 661, 601, DIG. 19, DIG. 29, DIG. 31, 288; 256/73.5

(56) References Cited

U.S. PATENT DOCUMENTS

| | | | |
|---|---|---|---|
| 3,280,567 A | * 10/1966 | Elliott et al. ............. 220/661 X |
| 3,432,072 A |   2/1967 | Quercia |
| 3,353,849 A | * 11/1967 | Laurizio ................. 220/288 X |
| 3,483,066 A | * 12/1969 | Harris et al. ...... 220/DIG. 31 X |
| 3,501,110 A | *  3/1970 | Hopgood et al. ......... 242/118.7 |
| 3,602,257 A | *  8/1971 | Berleyoung ...... 220/DIG. 31 X |
| 3,706,393 A | * 12/1972 | Curtis et al. ...... 220/DIG. 31 X |
| 3,889,710 A | *  6/1975 | Brost .................... 137/512.15 |
| 3,891,118 A | *  6/1975 | Laurizio ..................... 220/288 |
| RE29,448 E |  10/1977 | Brown et al. |
| 4,353,761 A |  10/1982 | Woerz et al. |
| 4,411,726 A |  10/1983 | Woerz et al. |
| 4,466,845 A |   8/1984 | Fortuna |
| 4,534,751 A |   8/1985 | Fortuna et al. |
| 4,579,242 A | *  4/1986 | Ellis, III ..................... 220/4.13 |
| 4,584,037 A |   4/1986 | Fortuna et al. |
| 4,606,470 A |   8/1986 | Barlics |
| 4,618,516 A | * 10/1986 | Sager ....................... 428/542.8 |
| 4,762,249 A |   8/1988 | Fortuna et al. |
| 4,776,499 A | * 10/1988 | Magid ..................... 222/386.5 |
| 4,784,956 A | * 11/1988 | Kepler et al. ............... 220/590 |
| 4,994,132 A |   2/1991 | Liekens et al. |
| 5,256,284 A | * 10/1993 | Lee ........................... 156/73.5 |
| 5,263,606 A | * 11/1993 | Dutt et al. .................. 220/613 |
| 5,287,987 A | *  2/1994 | Gaiser ........................ 220/589 |
| 5,376,200 A | * 12/1994 | Hall ...................... 220/589 X |
| 5,429,845 A | *  7/1995 | Newhouse et al. ..... 220/582 X |
| 5,476,189 A | * 12/1995 | Duvall et al. ........... 220/588 X |

FOREIGN PATENT DOCUMENTS

| | | |
|---|---|---|
| FR | 2 178 068 A | 11/1973 |
| GB | 2217254 | * 10/1989 |
| JP | 299328 | * 12/1987 |
| WO | 98/57092 | 12/1998 |

* cited by examiner

Primary Examiner—Stephen K. Cronin
Assistant Examiner—Joseph C. Merek
(74) Attorney, Agent, or Firm—Pearne & Gordon LLP (57) ABSTRACT

A pressurized vessel, such as a tank liner, is formed of a thermoplastic injection-molded connector or insert and a thermoplastic blow-molded vessel body. A noncylindrical skirt of the connector having a substantial surface area is spin-welded to a mating interface formed on the outer surface of the vessel body adjacent an orifice into which the insert is received. In a preferred embodiment, a sacrificed portion of an upstanding orifice sidewall forms a molten weld bead, which flows in a channel to fuse the skirt to the mating interface.

9 Claims, 9 Drawing Sheets

BLOW-MOLDED PRESSURE TANK WITH SPIN-WELDED CONNECTOR

TECHNICAL FIELD OF THE INVENTION

The present invention relates in general to methods and apparatus for fabricating pressure vessels from polymeric components, and more particularly relates to methods and apparatus for joining blow-molded components of such vessels to injection-molded components thereof.

BACKGROUND OF THE INVENTION

Pressurized vessels made of polymeric materials, such as resin tanks for water treatment systems, are known in the art. According to one conventional method of fabricating such vessels, a body of a tank or tank liner is blow-molded of a thermoplastic material. Once the body is completed, an insert, such as a threaded connector, is attached to the blow-molded body as by screws and, optionally, a sealing ring. Alternatively, such inserts may be glued to the body exterior.

These prior art methods have proven expensive and of doubtful utility; inserts attached by such methods have not produced sufficiently tight seals between the body and the insert, especially if the vessel is to be subjected to internal pressure or temperature cycling during use.

One attempt to overcome these prior art drawbacks is described in Liekens et al., U.S. Pat. No. 4,994,132. According to the Liekens patent, the pressure vessel body is blow-molded from a parison around an insert, the insert being sufficiently spaced from the internal surface of the parison that it is not damaged by heat during sidewall formation. After the blow-molded body has been formed, but before the body has cooled, the insert is moved from a position well inside the cavity toward the inside surface of an opening in the blow-molded body. The insert is then fused with the thermoplastic body material surrounding the opening and the apparatus which had held the insert is withdrawn. The Liekens method has the disadvantages of requiring complex fabrication machinery and requiring the components to be joined to be almost-molten, thus creating the danger of heat deformation and damage to portions of the vessel sidewall remote from the fusion site.

A technique called spin-welding is also known in certain container applications for welding two container components together. U.S. Pat. No. 4,762,249 issued to Fortuna et al. shows a technique for spin-welding a thermoplastic container end to a container body formed as a cylinder out of a composite material. The cylinder has a paperboard body and a thermoplastic coating. The cylinder coating is spin-welded to the container end. Containers of this type are useful for the packaging of nonpressurized fluids such as frozen orange juice and oil. The Fortuna '249 patent shows a vertical interface (that is, one which is aligned with the cylinder axis) between the thermoplastic layer of the composite cylinder and the thermoplastic can end. Other U.S. Patents issued to Fortuna show similar fabrication methods, such as U.S. Pat. Nos. 4,584,037 and 4,534,751. U.S. Pat. Nos. 4,353,761 and 4,411,726 issued to Woerz show a thermoplastic end member with a downwardly depending flange that is spin-welded to an interior thermoplastic coating of an open end of a composite cylinder made of thermoplastic-lined paperboard. The downwardly-depending flange or fin has a slight inward taper.

U.S. Pat. No. 4,466,845, also issued to Fortuna, shows two blow molded container components (a top and a bottom). Vertically-disposed flanges of the top and bottom halves are fitted together in an interference fit and friction-welded together. These containers are disclosed as relatively small and provided for fluids under pressure such as beer and soda.

U.S. Pat. No. 4,606,470 issued to Barlics shows a neck of a container which is adapted to be permanently closed by spin-welding to a container closure. The spin-welding occurs along a vertical interface and fines generated by the spin-welding are caught in a trough provided for the purpose.

None of these prior art references shows spin-welding as a method of fabricating large, plastic pressurized vessels, where the bonding along cylindrical interfaces may not suffice in maintaining integrity of the seal under long-term pressure.

SUMMARY OF THE INVENTION

The present invention provides a method and apparatus for manufacturing a vessel, particularly a large vessel, from a body and a separately formed connector or insert. The body is formed, as by blow molding, from a thermoplastic material and has an orifice with an interior margin. The orifice is formed around an axis. An outer surface of the body bounding the orifice is formed as a noncylindrical surface of rotation. An insert or connector, which is previously formed of a preferably thermoplastic material by a method such as injection molding, has a sidewall adapted to be inserted into the orifice and to have a first interface surface adjacent the interior margin of the body orifice. A second interface surface extends as a flange or skirt radially outwardly from a junction with the sidewall, and is formed as a substantial second noncylindrical surface of rotation that is complementary to the outer surface of the body bounding the orifice.

Machinery is provided to rotate at least one of the body and the insert relative to the other and to move them closer together along the axis until the noncylindrical surfaces of rotation come into contact. Responsive to this contact and to the rotational movement of one component with respect to the other, the noncylindrical surfaces of rotation are spin-welded together to form a fluid-impermeable bond between the two components which is strong enough to withstand fluids under pressure and to withstand separation forces due to differential flexing during temperature cycling.

According to another aspect of the invention, a sacrificial weld bead is provided on the outer surface adjacent the vessel body orifice prior to joining the body and the insert together. The viscosity of the thermoplastic material forming the body, at least in the region surrounding the orifice, is selected to be lower than the viscosity of the insert. In this way, the material of the weld bead is used to create a spin-weld of the two components along their interface.

In yet a further aspect of the invention, the initial profile of the body includes a region which is first contacted during the spin-welding process, and which is sacrificed to create the molten weld bead. A shoulder formed on the body acts as a further welding surface which ensures that the insert and body component will not separate during temperature cycling of the completed vessel.

According to yet another aspect of the invention, the outer surface of the blow-molded body adjacent the orifice is formed as a depression with respect to the outer surface of the body farther away from the orifice. In other words, the outer surface of the body is stepped radially inwardly near the orifice. The second interface surface of the insert is received within this depression. The depression acts to channel the melted material of the sacrificial weld bead so as to place the melted material at a beneficial location, and to create a substantially continuous outer surface once the two components are joined together.

BRIEF DESCRIPTION OF THE DRAWINGS

Further aspects of the invention and their advantages will be discerned in the following detailed description, in which like characters identify like parts, and in which.

DETAILED DESCRIPTION OF ILLUSTRATED EMBODIMENT

Figure 1:
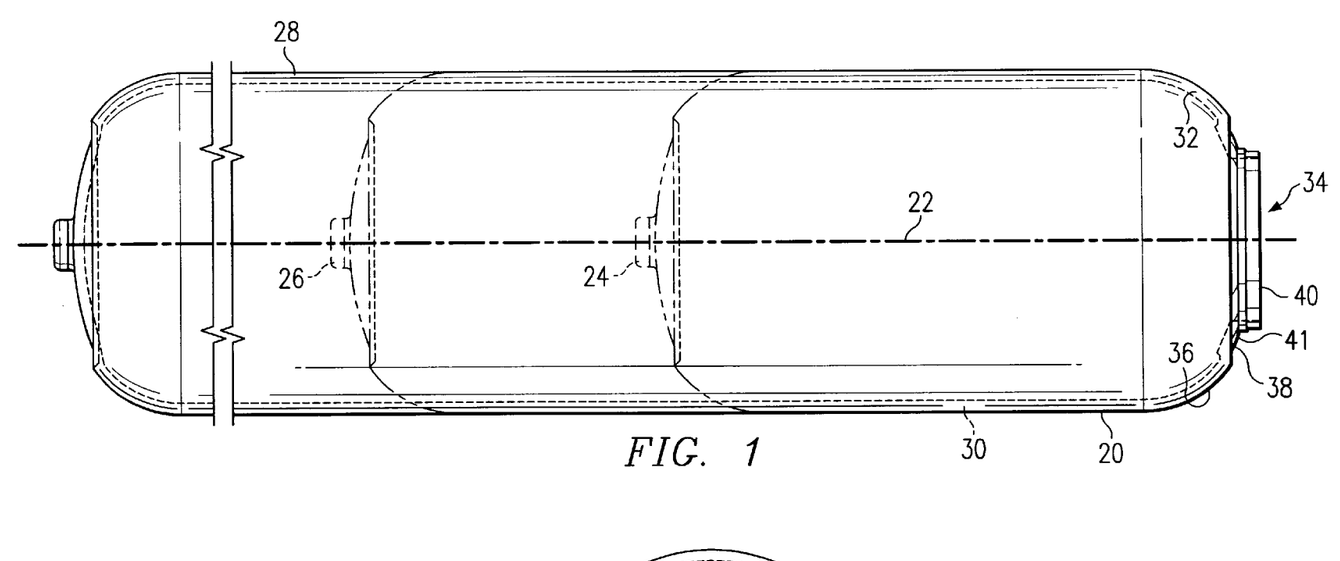
FIG. 1 is a partial elevational view of a blow-molded tank liner body fabricated according to the invention, shortened versions of the liner body being shown in phantom.

In FIG. 1, a body component of a vessel, such as tank liner body 20, is shown. In the illustrated embodiment, the tank liner body 20 is formed around an axis 22. An end 24 of a short version of the tank liner 20 is shown in phantom, the entire length of the short version of tank liner 20 being a little less than one foot. The illustrated tank liner body 20 and longer tank liner bodies having the same diameter may be easily fabricated using a blow molding technique. A tank liner 20 of a longer length (about eighteen inches) has an end wall shown in phantom at 26. Tank liners of an even longer length can be manufactured according to the invention. A cylindrical sidewall 28 of the tank liner body 20 may extend to such a distance that the entire tank liner may be three feet in length or more.

The tank liner body 20 is formed of a thermoplastic material, and in the illustrated embodiment is formed of a high density polyethylene (HDPE) polymer having a specific gravity of 0.940. Other compatible thermoplastics which will melt under frictional heat can be used, such as ABS (acrylonitrile-butadienestyrene), other styrene polymers such as SAN, polypropylene, nylon and polyphenylene oxide (PPO). The tank liner body 20 has a wall 30 which is sufficiently thick to withstand fluid under pressure, such as 200 psi.

Figure 2:
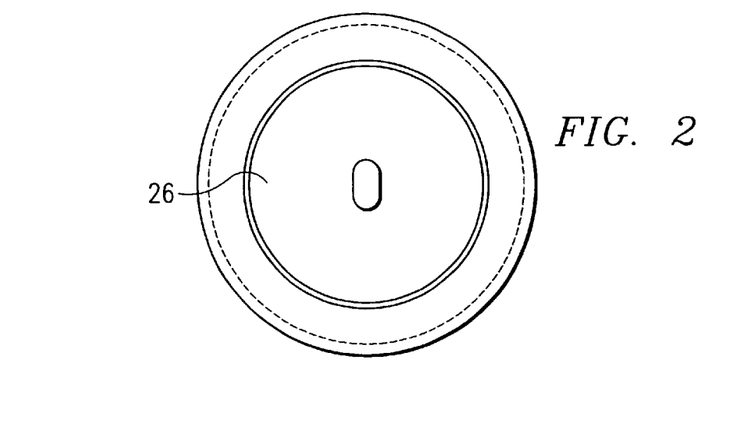
FIG. 2 is an end view of the liner shown in FIG. 1, illustrating the end opposite an opening end.

The tank liner body 20 has curved end walls 32 and 24 or 26 on either of its axial ends. An opposite or nonopening end wall 26 is illustrated in FIG. 2 in elevational view.

The liner body 20 has an orifice 34 which communicates the interior of the liner body 20 to the exterior. In the illustrated embodiment, the circular orifice 34 terminates the end wall 32 and is formed around the body axis 22. At least in the vicinity of the orifice 34, an outer surface 36 of the end wall 32 is formed as a noncylindrical surface of rotation, such as the flattened, convexly curved surface 36 shown in the illustrated embodiment. In alternative embodiments, the surface 36 could be a disk, a paraboloid, a spheroid, a frustoconical surface, or a more complicated shape, being either smoothly continuous or discontinuous or stepped in section, and either as everted toward the exterior or inverted toward the interior. A generally convexly curved surface 36 is preferred because of its pressure-withstanding characteristics and its relative ease of manufacture by blow-molding.

In yet further, nonillustrated embodiments, the orifice 34 need not be coaxial with the liner body axis 22. An orifice 34 could instead be formed on a portion of the cylindrical sidewall 30, as long as a nearby portion of the exterior surface of the sidewall 30 conforms to a noncylindrical surface of rotation around an axis of the orifice 34. In these alternative embodiments, a boss would be formed about the periphery of orifice 34 having a surface which would be a departure from the general cylindrical outer surface of the sidewall 30.

The outer surface 36 has a depressed portion 38 formed around orifice 34. The depressed portion 38 has an upper lateral surface or interface 41.

Figure 3:
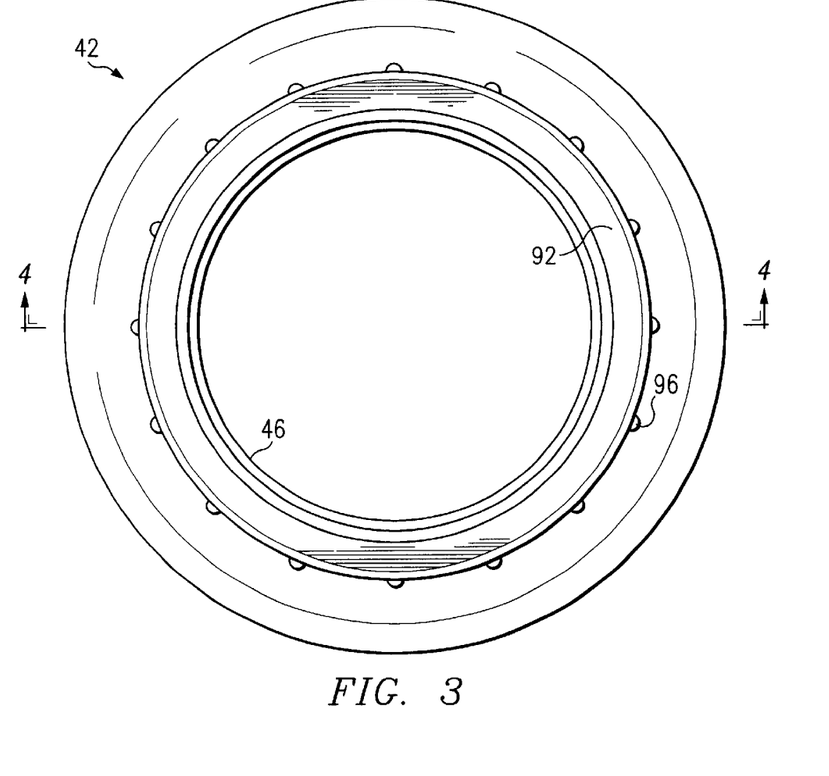
FIG. 3 is a top view of a threaded insert or connector according to the invention.
Figure 4:
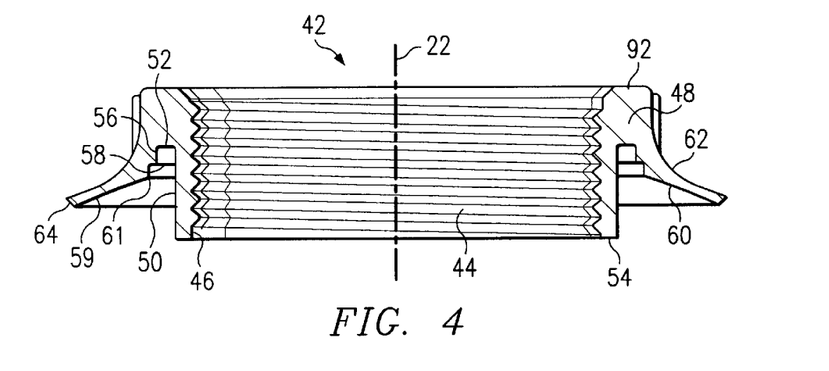
FIG. 4 is an axial sectional view taken substantially along line 4—4 of FIG. 3.

A representative insert 42 for the liner body 20 is illustrated in FIGS. 3 and 4 as being a threaded connector. Like the liner body 20, the insert is formed of a thermoplastic material, such as high density polyethylene; other thermoplastic polymers such as acrylonitrile butadiene styrene copolymer (ABS), other styrene copolymers such as SAN, polypropylene, nylon and polyphenylene oxide (PPO) may be used instead. Preferably, the viscosity of the insert 42 in a molten state is higher than that of the body 20 at the same temperature, or at least higher than the composition of the body 20 in the vicinity of the orifice 34. The inclusion of fiberglass particles in the composition of the insert 42 elevates its viscosity by an amount sufficient to cause the friction-melting and displacement of certain portions of the material of the liner body around the orifice 34, while little of the material of the insert 42 is so displaced. The inclusion of fiberglass particles in the insert also makes the surfaces of the insert more abrasive, enhancing the spinwelding process described below. In the illustrated embodiment, the composition of insert 42 is about 30% fiberglass, and the melting point of the insert 42 is about 204° C. The melting point of the liner body 20 is about 204° C. In an alternative embodiment, the composition of the insert 42 may be chosen to have a higher melting point than the composition of the liner body 20.

Because of its typical function as a connector to e.g. other plumbing or fluid-carrying components, the insert 42 is manufactured to narrower tolerances than the blow-molded liner body 20, and has a different composition, i.e., fiberglass is molded into it. For these reasons the insert 42 is formed as by injection molding as a separate unit. The illustrated insert 42 is a threaded connector, having threads 44 on an inner, cylindrical surface 46 of a downwardly extending main sidewall 48.

An outer surface 50 of the sidewall 48 is cylindrical from an upper limit, recess, annular surface or stop 52 to a lower end 54 of the insert 42.

The recess surface 52, which in the illustrated embodiment is an annular disk formed in a plane orthogonal to the axis 22, is bounded in a radial outward direction by a downwardly depending cylindrical surface 56, which extends downwardly by a short distance such as a sixteen hundredths of an inch. At its lower terminus the downwardly depending surface makes a corner with a radially outwardly extending surface 58, which in the illustrated embodiment is orthogonal to the axis 22 and extends outwardly by about a tenth of an inch. A further, more outwardly spaced cylindrical surface 59 extends from the outer margin of horizontal surface 58 downwardly to a point 61. From this point a lower surface or interface 60 of a flange or skirt 62 extends both downwardly and outwardly at an acute angle relative to the axis 22. The interface 60 is a noncylindrical surface of rotation about axis 22, such that it will be able to transmit a substantial component of axial force to the surface 41 of the depression 38 (FIG. 4), with which it is designed to mate. In the illustrated embodiment, the interface 60 is concavely curved, a shape which is complementary to the convexly curved surface 41 of the depression 38. The skirt 62 terminates at an outer margin 64. The depth and outer radial limit of the depression 38, and the thickness and outer radial limit of the skirt 62, are chosen such that the skirt 62, together with melted material from the spin-welding process, will fill the depression 38. In this manner, the outer surface of the end wall of the completed vessel will be substantially continuous.

Figure 5:
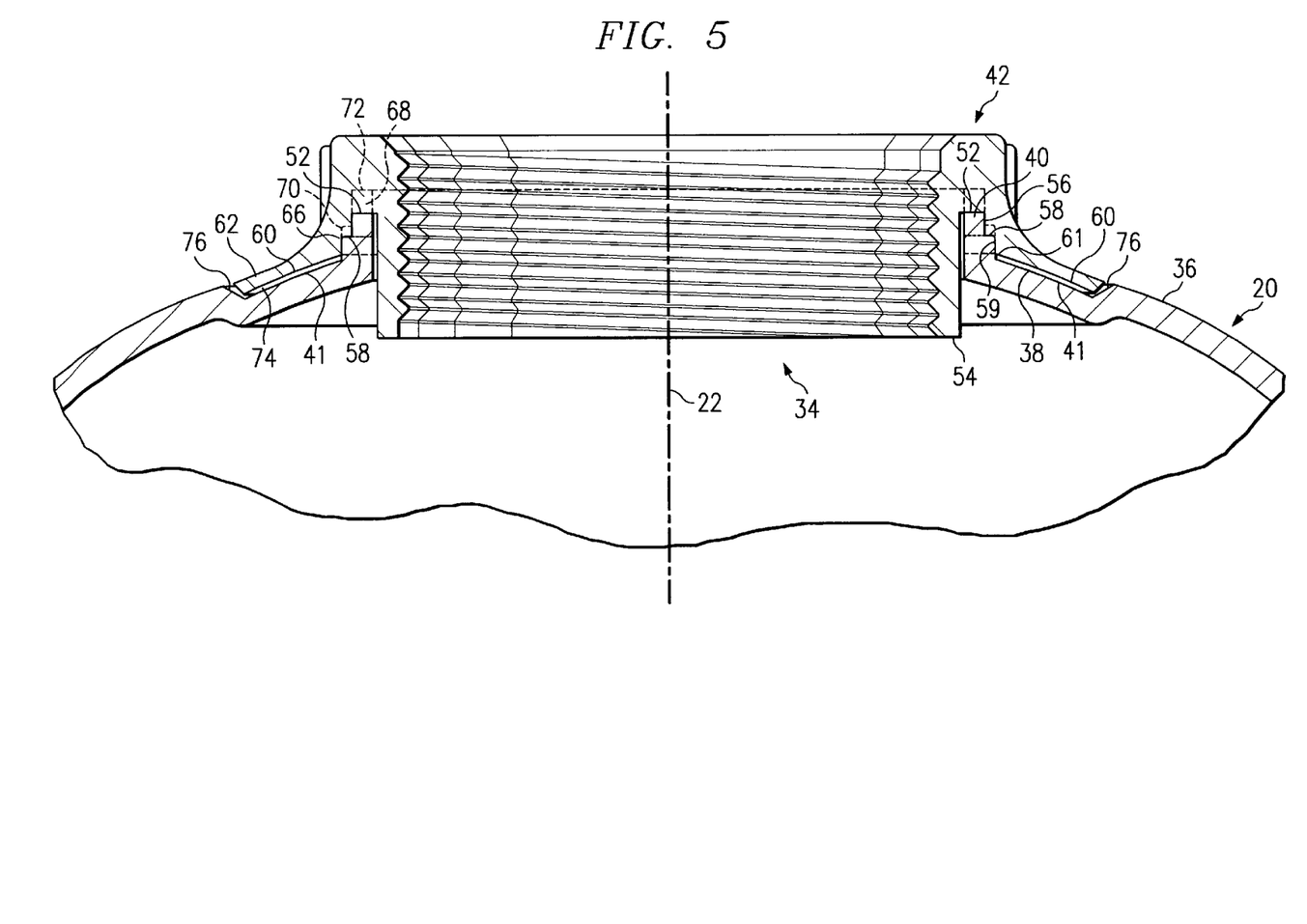
FIG. 5 is a detailed axial sectional view of an insert and tank liner according to the invention, the images of the insert and the tank liner being juxtaposed to show material to be sacrificed during spin-welding.

When the insert 42 is juxtaposed on the orifice 34 to which it designed to be joined, as shown in FIG. 5, it becomes apparent that a portion 68 of the upstanding sidewall or flange 40 of the liner body 20 does not correspond with the profile of the insert 42. Portion 68 of the sidewall 40, and to a lesser extent a liner shoulder 70 formed below it, are melted by the friction generated by contacting top surface 72 of portion 68 with the recess surface 52 and rotating surface 52 with respect thereto, and later in the spin-welding process contacting and rotating the insert surface 58 on the shoulder 70 of sidewall 40 to form a molten weld bead. This fluid bead of thermoplastic material flows into a channel 74 bounded and defined by the lower interface surface 60 of the skirt 62, on the one hand, and the surface 41 of the depression 38, on the other. As the molten material leaves the zone in which friction is generated, it cools and resolidifies, creating a strong, wide circumferential weld between the lower insert surface 60 and the lateral surface 41 of the depression 38. An end lip 76 of the depression 38 serves as a terminus of the depression 38 and acts to contain the molten material.

Figure 6:
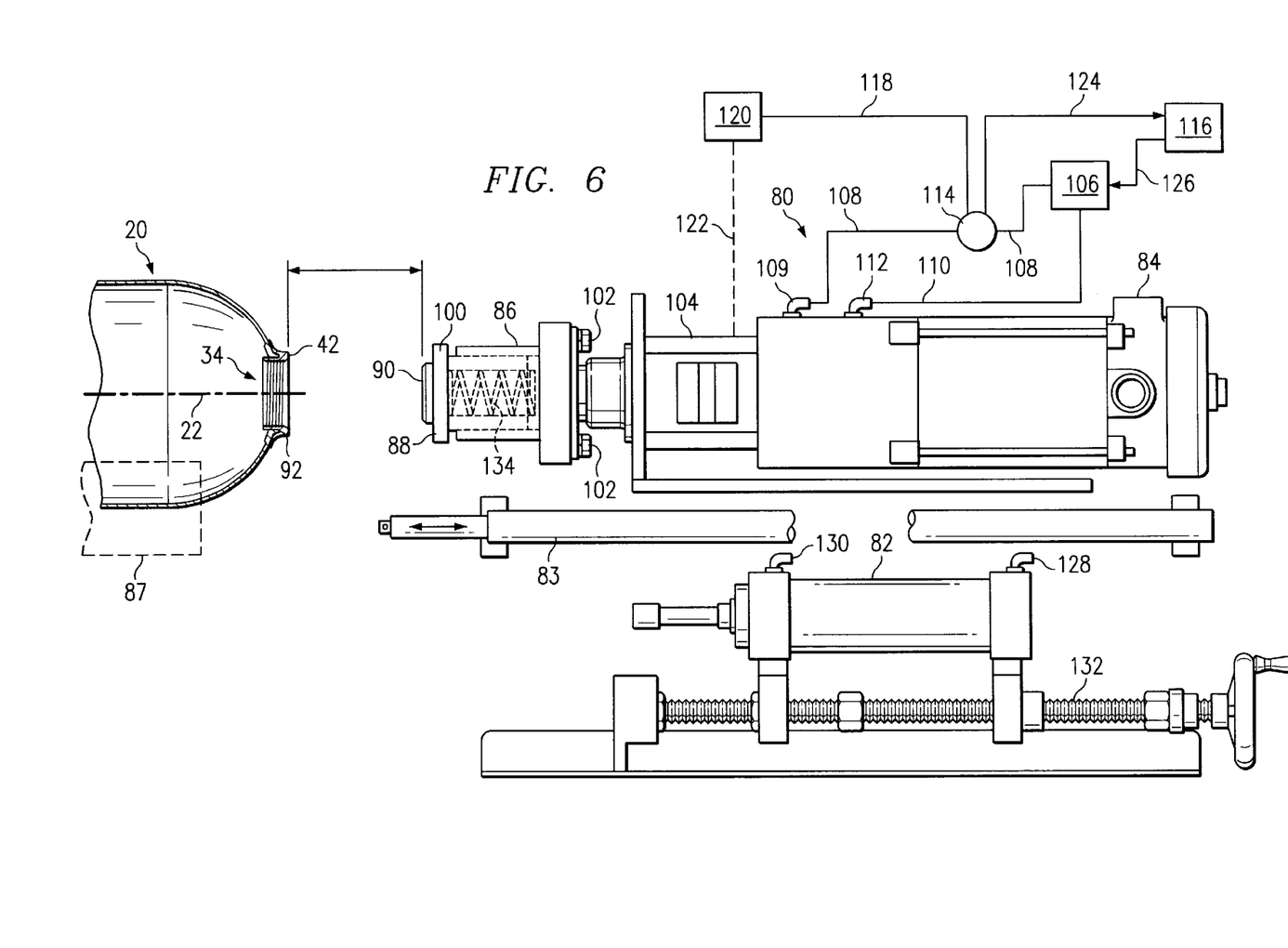
FIG. 6 is a part schematic, part elevational view of a tank liner/insert spin welding machine according to the invention.

FIG. 6 is an elevational view of a portion of a machine, indicated generally at 80, which is designed to spin-weld an insert 42 into an orifice 34 of the liner body 20. FIG. 6 shows an insert 42 freshly attached to a liner body 20 and the machine 80 in a retracted position. A motor 82, which in the illustrated embodiment is a linear hydraulic motor, controls the horizontal position of a frame 83. Attached to the frame 83 is a rotary head 86 which is adaptable to be spun by a rotary motor 84, also mounted on the frame 83, at a high rate of speed, such as 4000 rpm. A clamping mechanism, shown schematically at 87, which for example can be a v-block self-centering clamping mechanism in which cradling faces of the V block are disposed in planes which are parallel to axis 22 and which intersect each other, fixes the liner body 20 and its orifice 34 with respect to the axis 22 both axially and angularly. The rotary head 86 is disposed to be coaxial to the orifice 34. An insert 42 is placed on the head 86. The head 86 is then spun, and the cylinder 82, which preferably has a stroke that is parallel to the axis 22, moves the rotary head 86 toward the body 22.

Figure 7:
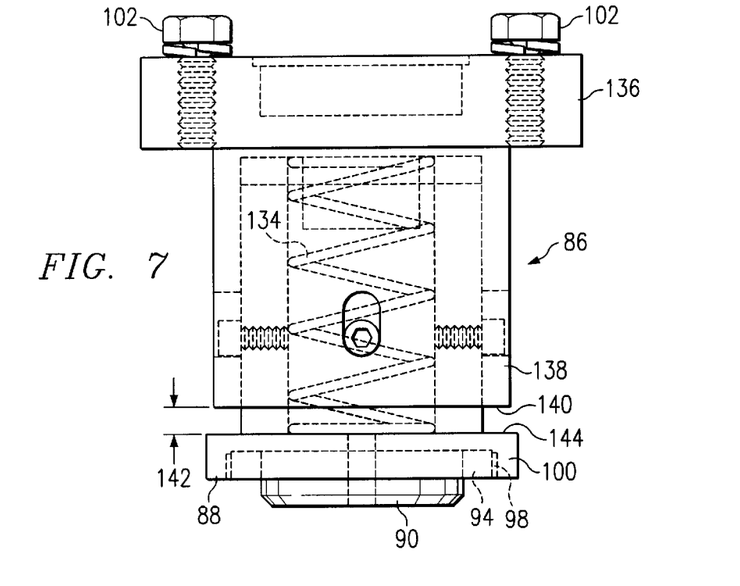
FIG. 7 is a detail of FIG. 6, showing an insert drive head assembly according to the invention.

Certain structural characteristics of the rotary head 86 are shown in more detail in the elevational view of FIG. 7. A drive head insert plate 88 includes a central insert 90 which is inserted into the mouth of the connector 42. A shoulder 92 of the connector 42 (FIG. 3) is inserted into an annular receiving channel 94. The shoulder 92 is equipped with a series of keying or wrench surfaces 96, which in the illustrated embodiment are convex semi-cylindrical projections formed on the exterior sidewall of the shoulder 92. These keying surfaces 96 fit within respective concave keying or wrench surfaces 98 in the drive head insert plate 88. The keying surfaces 98 are formed on an inner surface of an outer sidewall 100 of the drive head insert plate 88.

Referring back to FIG. 6, the drive head 86 is attached as by means of bolts 102 to a clutch mechanism 104. The clutch mechanism 104 selectively imparts torque to the drive head 86 from the rotating motor 84, such as a hydraulic motor. In the illustrated embodiment, a pump 106 is connected via a line 108 to a hydraulic port 109, and a return hydraulic fluid line 110 couples a hydraulic port 112 back to the pump 106. A hydraulic pressure sensor 114 is installed on the line 108 to sense the pressure of line 108. Pump 106 is actuated by an electrical power supply 116.

Either or both of two control paths may be used to control whether the hydraulic motor 84 imparts rotational force to the drive head 86. First, a sense line 118 can connect the pressure sensor 114 to a controller 120, which controls the clutch 104 by an appropriate control path 122. Control of the clutch 104 may be had by means of hydraulic valving and a pulse width modulated (PWM) signal path thereto. Instead or in addition, the pressure sensor 114 may be connected via a sense line 124 to the switchable power supply 116; if the pressure as sensed by sensor 114 become too high, the power supplied by power supply 116 to the pump 106 on power line 126 will be interrupted. Since the fluid pressure as sensed by sensor 114 is related to the torque being applied by the drive head 86, sensor 114 effectively measures drive head torque, and power supply 116 and/or controller 120 can use the signal from sensor 114 to effectively sense when there is an increase in torque of the drive head 186 above a predetermined limit, in turn indicative of the beginning of fusion of the molten weld bead within channel 74.

Alternatively, the spin-welding process can simply be timed and terminated at the end of a predetermined, adjustable time limit.

The linear hydraulic cylinder 82 has hydraulic ports 128 and 130 to control the actuation of the linear cylinder 82. Hydraulic fluid is supplied to the cylinder 82 by appropriate electrical controls and hydraulic valving (not shown); in one embodiment, pump 106 may supply pressurized hydraulic fluid to all hydraulic motors of the machine. The cylinder 82 is mounted on a mechanical adjustment screw 132 to adjust its stroke and position.

Returning to FIG. 7, the drive head 86 further includes a helical compression spring 134 on which the drive head insert plate 88 is supported. The helical spring 134 is disposed between the insert plate 88 and a drive head attachment plate 136. Spring 134 is provided to regulate the axial force delivered by the drive head 86 against the liner body 20. The helical spring 134 resides within a cylindrical member 138 which terminates in an annular forward surface or end 140. The end 140 helps define a range of motion indicated at 142. As long as a rear surface 144 of the insert plate 88 is within the range of motion 142, the force applied by the drive head 86 to the insert 42 and cylindrical body 20 will be substantially dictated by the compressive force provided by the helical spring 134. As long as the surface 144 is within the range of motion 142, the compressive force exerted by the drive head 86 will be proportional to the rearward displacement of surface 144 from the illustrated position and the spring constant of compression spring 134. The spring-loading of the coupling plate 88 prevents the transmission of excessive axial force to the insert 42 and liner body 20, and assures that the two liner components 20 and 42 are under constant compression during spin-welding.

Figure 8:
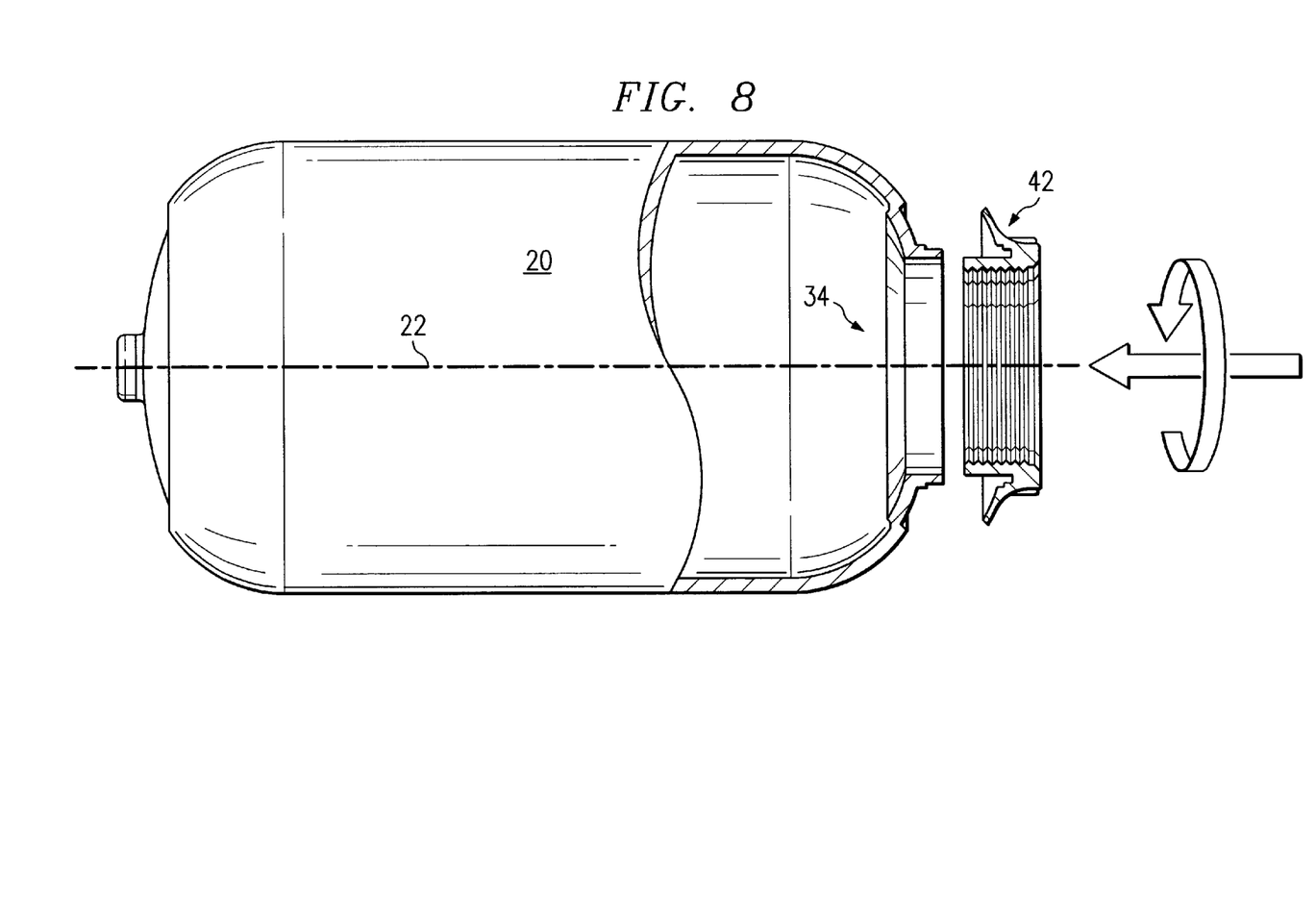
FIG. 8 is a schematic view of a liner body and insert according to the invention with a part of the liner sidewall broken away and the insert shown in axial section, illustrating a first step of assembly.
Figure 9:
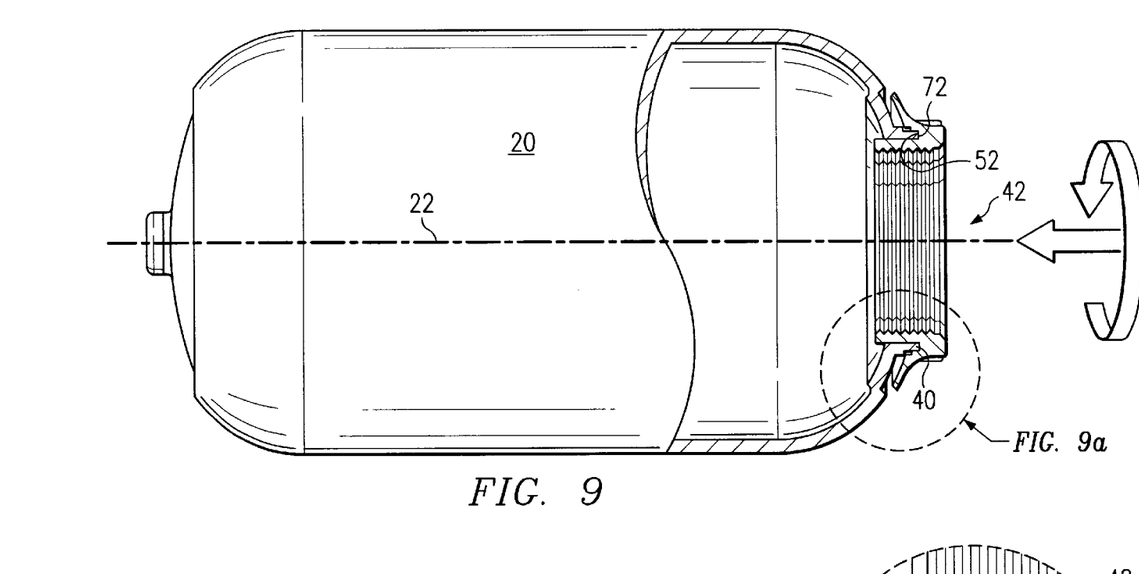
FIG. 9 is a schematic sectional view similar to that shown in FIG. 8, illustrating a second step of assembly.
Figure 9A:
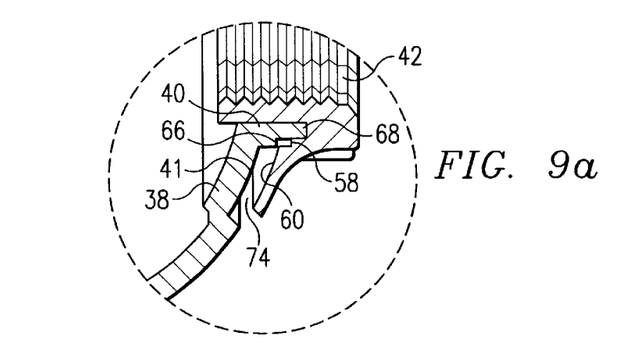
FIG. 9a is a magnified detail of FIG. 9.

FIGS. 8–10a illustrate successive stages in a spin-welding process according to the invention. FIG. 8 shows a first stage in this process. The insert 42 is fitted to the drive head insert plate 88 and is rotated around orifice axis 22, such as in a clockwise direction, and advanced axially toward the liner body 20 by the linear cylinder 82 (FIG. 6). The next stage is shown in FIG. 9 in which the recess surface 52 of the insert 42 has made contact with the top surface 72 of the sacrificial portion 68. As shown in the detail illustrated in FIG. 9a, in this condition there is still a gap between the shoulder 66 of the upstanding flange 40 and the horizontal surface 58 of the insert 42. When the surfaces 52 and 72 make contact, sacrificial portion 68 of the flange 40 will begin to melt due to heat generated by the spinning friction. The molten material flows into the channel 74 between insert interface 60 and lateral surface 41 of the depression 38.

Figures 10, 10A:
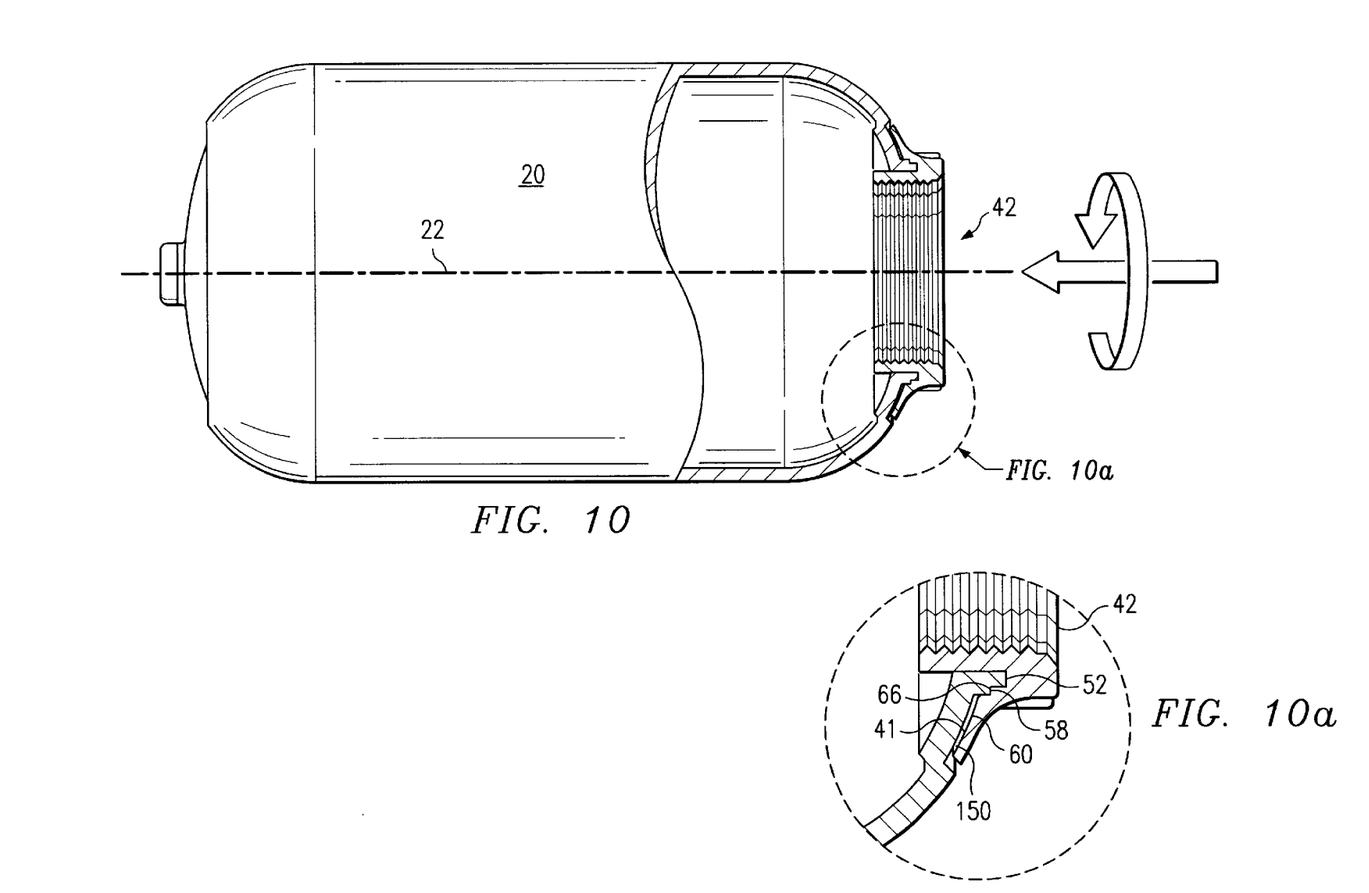
FIG. 10 is schematic sectional view similar to FIGS. 8 and 9, showing a final stage of assembly.
FIG. 10a is a detail of FIG. 10.
Figure 11:
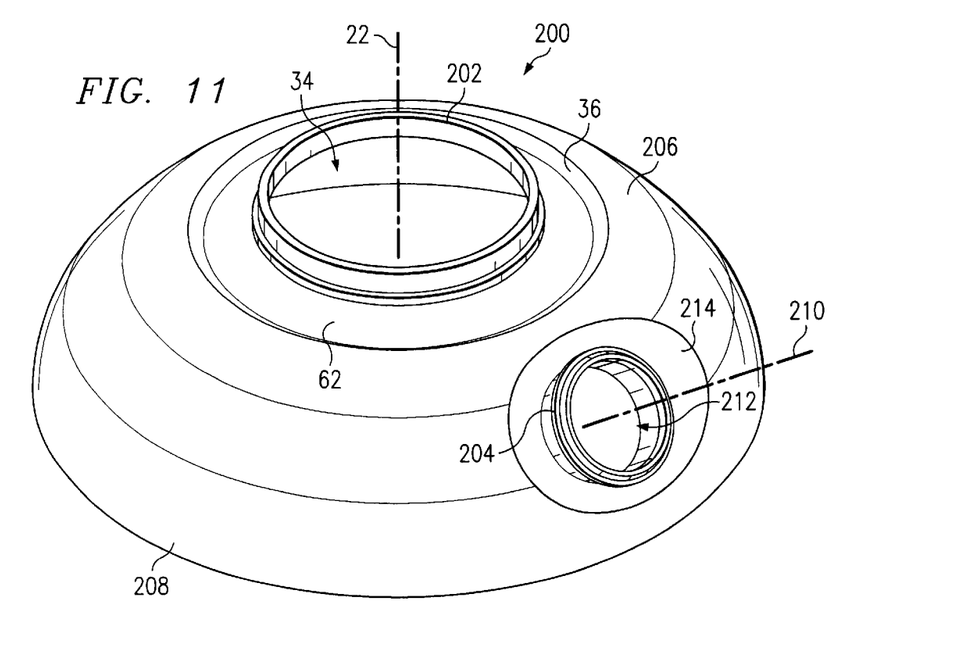
FIG. 11 is an isometric view of an end portion of a completed vessel according to a second embodiment of the invention, showing the use of two inserts.
Figure 12:
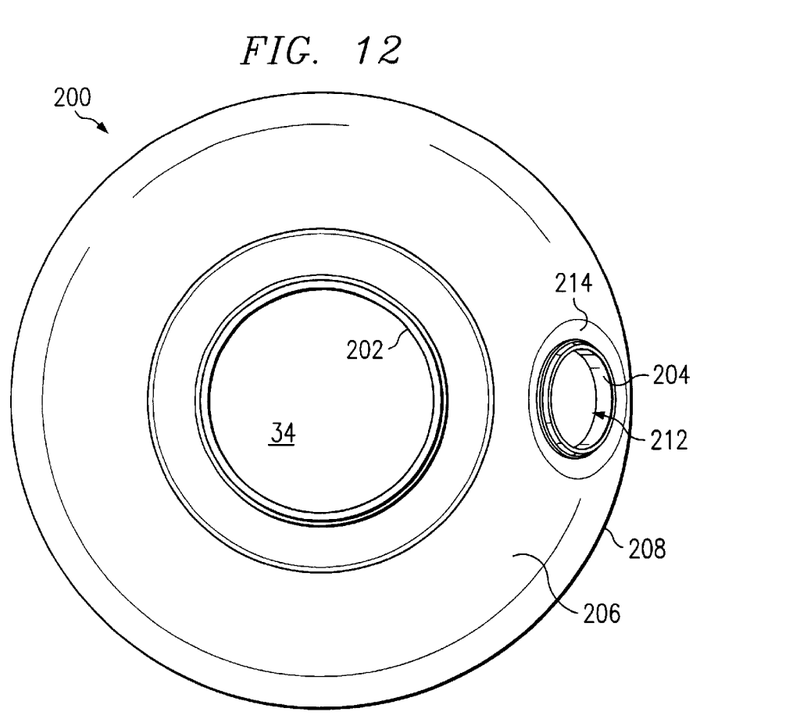
FIG. 12 is an end view of the vessel shown in FIG. 11.
Figure 13:
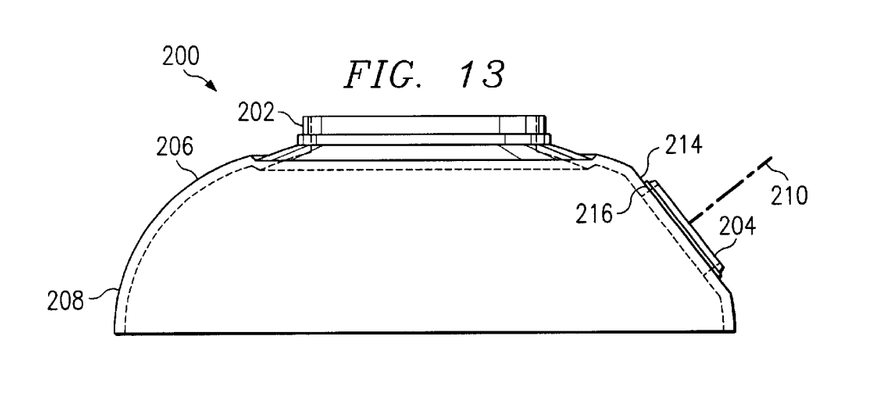
FIG. 13 is a side view of the end portion of the vessel shown in FIG. 11.

FIG. 10 illustrates the insert 42 and the liner body 20 in a last stage of the joining process. In this configuration, surfaces 66 and 58 (FIG. 10a) are abutting each other. Surfaces 66 and 58 provide a further molten interface, spaced from sacrificial portion 68, which forms a further welding or tacking surface. This second weld surface is important for preventing separation of the insert from the liner body during thermal cycling of the completed vessel. Because the shape and sectional profile of the insert 42 is necessarily different from the shape and profile of the insert 42 is necessarily different form the shape and profile of the tank liner body 20, and because the compositions of the two components are different, they will expand and flex in different ways as the vessel is heated and cooled. This differential flexing, if not countered, could cause separation and failure. The provision of a tacking surface spaced from the sacrificial weld bead 68 and the skirt interface 41/60 resists differential flexing and keeps thermal expansion and contraction of the two components more geometrically congruent. The entire joining process, from the beginning of rotation to completion of the weld, takes about three seconds.

A principal technical advantage conferred by the present invention is that a weld bead 150 is used to join the insert to the cylindrical body 20 across a relatively large interface 41/60. This joining method is strong enough to withstand internal pressures in the vessel interior of several hundred psi. The process of joining the insert 42 to the body 20 can be done with relatively simple mechanical equipment, during a relatively small amount of time, and without significant deformation or structural damage due to heat deformation of the components to be joined.

We claim:

1. A kit for forming a vessel, comprising:
   an insert component having a body with a top end and a bottom end, the body of the insert component formed around a spin-welding axis, the insert component including
   a downwardly extending inner sidewall adapted to be downwardly inserted into an orifice of a vessel body component and
   a skirt disposed radially outwardly of the inner sidewall and extending downwardly from the body, the skirt and the inner sidewall defining therebetween an annular channel, the channel being closed at a top end thereof and open toward the bottom;
   a radially inwardly facing surface of the skirt including a first segment extending downwardly from the top end of the channel to a lower end of the first segment, the first segment having a first length in an axial direction, a first shoulder having an inner end joined to the lower end of the first segment and extending radially outwardy from the lower end of the first segment to an outer end of the first shoulder, and a second segment having an upper end joined to the outer end of the first shoulder and a lower end, the second segment extending downwardly from the shoulder and having a second length in an axial direction; and
   a vessel body component having an orifice formed around a spin-welding axis, the orifice surrounded by an upstanding sidewall adapted to be inserted into the channel of the insert component, the upstanding sidewall having a top end and a radially outwardly facing surface extending downwardly from the top end, the radially outwardly facing surface having a third segment extending downwardly from the top end of the upstanding sidewall to a lower end of the third segment and having a third length in the axial direction, a second shoulder having an inner end joined to the lower end of the third segment and extending radially outwardly from the third segment to an outer end of the second shoulder, and a fourth segment extending downwardly from the outer end of the second shoulder to a lower end of the fourth segment and having a fourth length in an axial direction; wherein
   the third length is longer than the first length, the fourth length being longer than the second length, an intentional mismatch of the first and third lengths defining a first sacrificial portion adjacent the top end of the upstanding sidewall of the vessel body component, an intentional mismatch of the second and fourth lengths defining a second sacrificial portion adjacent the shoulder of the upstanding sidewall of the vessel body component, the sacrificial portions used to join the insert component to the body component upon spin-welding the insert component to the vessel body component.

2. The kit of claim 1, wherein the insert component is formed by injection molding and the vessel body component is formed by blow-molding.

3. The kit of claim 1, wherein the insert component and the vessel body component are of different compositions.

4. The kit of claim 1, wherein the spin-welding axis of the vessel body component and an axis of the vessel body component are aligned.

5. The kit of claim 1, wherein the spin-welding axis of the vessel body component and an axis of the vessel body component are at an angle to each other. vessel body are at an angle to each other.

6. A vessel, comprising:

an insert component having a top end and a bottom end and formed around a spin-welding axis, the insert component including a downwardly extending inner sidewall, and a skirt disposed radially outwardly of the inner sidewall and extending downwardly, the skirt and the inner sidewall defining therebetween an annular channel, the channel being closed at a top end therefor and open toward the bottom end of the insert component;

a radially inwardly facing surface of the skirt including a first segment extending downwardly from the top end of the channel to a lower end of the first segment, a first shoulder having an inner end joined to the lower end of the first segment and extending radially outwardly from the lower end of the first segment to an outer end of the first shoulder, and a second segment having an upper end joined to the outer end of the first shoulder and a lower end, the second segment extending downwardly from the outer end of the first shoulder; and a vessel body component having an orifice formed around the spin-welding axis, the orifice surrounded by an upstanding sidewall which is spin-welded into the channel of the insert component, the upstanding sidewall having a top end and a radially outwardly facing surface extending downwardly from the top end of the upstanding sidewall, the radially outwardly facing surface of the upstanding sidewall having a third segment extending downwardly from the top end of the upstanding sidewall to a lower end of the third segment, a second shoulder having an inner end joined to the lower end of the third segment and extending radially outwardly to an outer end of the second shoulder, a fourth segment of said radially outwardly facing surface having an upper end joined to the outer end of the second shoulder and extending downwardly to a lower end of the fourth segment: wherein the top end of the upstanding sidewall of the vessel body component adjoins the top end of the channel of the insert, the first segment of the radially inwardly facing surface of the skirt adjoins the third segment of the radially outwardly facing surface of the upstanding sidewall of the vessel body component, the first shoulder of the skirt adjoins the second shoulder of the vessel body component, and the second segment of the radially inwardly facing surface of the skirt adjoins the fourth segment of the radially outwardly facing surface of the upstanding sidewall.

7. The vessel of claim 6, wherein a general outer surface of the vessel body component adjacent the upstanding sidewall of the vessel body component is at a substantial angle to the upstanding sidewall, an annular depression formed in said general outer surface adjacent the lower end of the fourth segment of the upstanding sidewall and extending radially outwardly therefrom, a flange of the skirt of the insert component having a lower surface with an inner end joined to the lower end of the second segment of the radially inwardly facing surface of the skirt and extending radially outwardly therefrom, the flange of the skirt received into the depression of the general outer surface of the vessel body component when the insert component is spin-welded to the vessel body component.

8. The vessel of claim 7, wherein a molten weld bead is formed when the insert component is spin-welded to the vessel body component, the depression having an outer radial margin adapted to limit the outer radial progress of the weld bead prior to solidification.

9. The vessel of claim 7, wherein the annular depression in the general outer surface of the vessel body component has a preselected depth which is adapted to receive the flange of the skirt of the insert, such that the outer surface if the finished vessel at the location of the skirt flange will be substantially continuous.

* * * * *

UNITED STATES PATENT AND TRADEMARK OFFICE
CERTIFICATE OF CORRECTION

PATENT NO. : 6,793,095 B1
DATED : September 21, 2004
INVENTOR(S) : Dulisse et al.

It is certified that error appears in the above-identified patent and that said Letters Patent is hereby corrected as shown below:

<u>Title page,</u>
Item [56], References Cited, U.S. PATENT DOCUMENTS, delete "4784,956 A * 11/1998 Kepler et al." and insert -- 4,785,956 A * 11/1998 Kepler et al. --

<u>Column 9,</u>
Lines 1 and 2, delete "vessel body are at an angle to each other.".

<u>Column 10,</u>
Line 34, delete "surface if" and insert -- surface of --.

Signed and Sealed this

Twenty-eighth Day of December, 2004

JON W. DUDAS
*Director of the United States Patent and Trademark Office*